United States Patent [19]

Cole

[11] Patent Number: 5,027,918
[45] Date of Patent: Jul. 2, 1991

[54] SIDEWALL LOCKING DOWNHOLE SEISMIC SIGNAL DETECTOR

[75] Inventor: Jack H. Cole, Ponca City, Okla.

[73] Assignee: Conoco Inc., Ponca City, Okla.

[21] Appl. No.: 613,328

[22] Filed: Nov. 13, 1990

[51] Int. Cl.⁵ .............................................. G01V 1/40
[52] U.S. Cl. .................................. 181/102; 181/105; 181/401; 367/25; 175/50; 73/151
[58] Field of Search ............... 181/102, 104, 105, 106, 181/401; 367/25; 175/50; 73/151, 152

[56] References Cited

U.S. PATENT DOCUMENTS

| | | | |
|---|---|---|---|
| 3,370,657 | 2/1968 | Antle | 175/74 |
| 4,293,815 | 10/1981 | West et al. | 324/254 |
| 4,381,610 | 5/1983 | Kramer | 33/312 |
| 4,648,478 | 3/1987 | Dedole et al. | 181/106 |
| 4,651,311 | 3/1987 | Owen et al. | 367/147 |
| 4,699,240 | 10/1987 | Dedole | 181/113 |
| 4,702,343 | 10/1987 | Paulsson | 181/106 |
| 4,715,470 | 12/1987 | Paulsson | 181/106 |

*Primary Examiner*—Deborah L. Kyle
*Assistant Examiner*—J. Woodrow Eldred

[57] ABSTRACT

Apparatus for carrying and positioning seismic detector equipment down a cased borehole and which includes a three component signal detector, azimuth sensing equipment and a particular type of borehole clamping arrangement that includes a combination of serrated locking pads, a contact rod and an inflatable bladder functioning in three point contact. An apparatus results that assures an improved form of three component geophone array that is lighter, easier handled and more reliably clamped within a borehole while having the additional azimuth sensing capability.

12 Claims, 2 Drawing Sheets

SIDEWALL LOCKING DOWNHOLE SEISMIC SIGNAL DETECTOR

BACKGROUND OF THE INVENTION

1. Field of the Invent

The present invention relates to a downhole apparatus and more particularly to an apparatus for carrying and positioning seismic detector equipment within a wellbore.

2. Related Prior Art

A typical state of the art, sidewall clamping downhole geophone package of the type generally used in engineering geophysics work has several deficiencies.

Prior art shallow well devices were tested early in 1988 and used in a shallow, high frequency seismic experiment in Starke, Fla. The principal investigator concluded that these devices are not adequate for future needs in borehole geophysics research. Some of the shortcomings are as follows. The package is generally limited to clamping diameters of six inches or less. The maximum operating depth is two hundred feet below water level. Maintaining the required five psi packer pressure for clamping is difficult. Downhole azimuthal sensing is not included.

Oil field service companies make sidewall locking receivers for deep well operation. However, such receivers are very expensive, do not contain azimuth sensing, and do not provide continuous three point clamping. They are also very heavy, typically weighing one hundred pounds or more. The heavy weight cuts down on the ability of the receiver to respond to higher frequency seismic signals.

Other representative receiver configurations available for use in seismic well surveys were also tested. All are basically cylindrically shaped, heavy (one hundred fifty-five to two hundred seventy-five pounds), long (seven to twelve feet), and employ swing out arms for clamping. None contain built in azimuth sensing.

Prior art has disclosed many methods and apparatus for transporting various types of equipment down a wellbore for use at subsurface locations. The following patents are examples of different means for moving and positioning equipment downhole.

U.S. Pat. Nos. 4,702,343, "Non destructive Downhole Seismic Vibrator Source and Processes of Utilizing the Vibrator to Obtain Information About Geologic Formations" and 4,715,470, "Downhole Electromagnetic Seismic Source" (Paulsson) relate to seismic sources for use down a borehole which require a clamping device. FIG. 4 of the '470 patent illustrates a configuration consisting of a clamping plate hydraulically forced against one side of the borehole to securely position opposite side contact pads 132a, 132b tightly against the borehole wall. A similar clamping arrangement is shown in FIG. 3 of the '343 patent as pad 36 and opposite side gripping surfaces 32a, 32b. The alternative structure of both patents to Paulsson is a four point hydraulically actuated plurality of clamping feet as illustrated in FIG. 2 of the '470 patent. The '343 patent also includes seismic signal detector means on the tool so that it can also perform seismic logging operations. As a result, this device is a heavy weight device.

U.S. Pat. No. 4,648,478 "Device for Generating Sound Pulses Inside a Well, by Percussion" (Dedole et al.) and U.S. Pat. No. 4,699,240, "Device for Applying Pulsed Radial Stresses to the Wall of a Well" (Dedole) relate to seismic energy sources carried in a downhole tool that includes anchorage shoes which are hydraulically extendable to secure positioning in the borehole wall. The anchoring shoes are extended in a three point array to hold the downhole tool centered within the borehole. This structure is intended for heavy weight support.

U.S. Pat. No. 4,651,311 "Electrodeless Spark Discharge Acoustic Pulse Transducer for Borehole Operation" and "Asymmetrical Lateral-Force Seismic Source Transducer" (Owen et al.) relate to a downhole tool carrying an electric arc pulse transducer that is supported in a borehole by means of an expandable rubber boot.

U.S. Pat. No. 4,293,815 (West et al.) relates a magnetometer system for use downhole as the flux gate circuit and the supporting circuits are contained in a logging tool casing 16 of the non-clampable type.

U.S. Pat. No. 4,381,610 "Self-Contained Downhole Compass" (Kramer) discusses a self-contained compass apparatus that is freely suspended into a borehole to determine selected azimuth findings.

U.S. Pat. No. 3,370,657 "Stabilizer and Deflection Tool" (Antle) generally illustrates an apparatus which is used as a stabilizer between the lower end of a drill string and a rotary drill bit. This patent illustrates methods and apparatus used for stabilizing downhole equipment used for drilling.

SUMMARY OF THE INVENTION

The present invention is an apparatus for carrying seismic detector equipment for positioning down a cased borehole and which includes a three component signal detector, azimuth sensing equipment and a particular type of borehole clamping arrangement that include a combination of two serrated locking pads and an inflatable contactor functioning in three point contact. Design criteria assure an improved form of three component geophone array that is lighter, easier handled and more reliably clamped within a borehole while having the additional azimuth sensing capability. The present invention uses an inflation type bag actuator for the actuation leg of the three point arrangement, providing continuous line contact of the actuation leg with the borehole. This arrangement provides a much more rigid clamping action than do other existing methods while exerting less stress on the casing side wall.

DESCRIPTION OF THE PREFERRED EMBODIMENT

Design criteria for the receiver system of the present invention are listed as follows. The receiver system must contain a three component geophone array. Next, the receiver system must have a strong, controllable clamping force. The receiver system should provide a three point clamping configuration as viewed looking down the borehole. The present invention provides optional built-in azimuth sensing capability. Due to its improved design, the receiver system of the present invention weighs less than 40 lb. to permit manual handling in shallow wells (one hundred fifty feet deep).

However, the receiver system of the present invention must be capable of operation in cased wells at least three thousand feet deep. The system of the present invention must be structurally rigid such that when clamped to the sidewall, unwanted resonant vibrations are not set up in the receiver structure which could introduce noise into the received signal. Finally, the receiver system of the present invention must be usable in varying pipe or casing sizes up to eight inches inside diameter.

Figure 1:
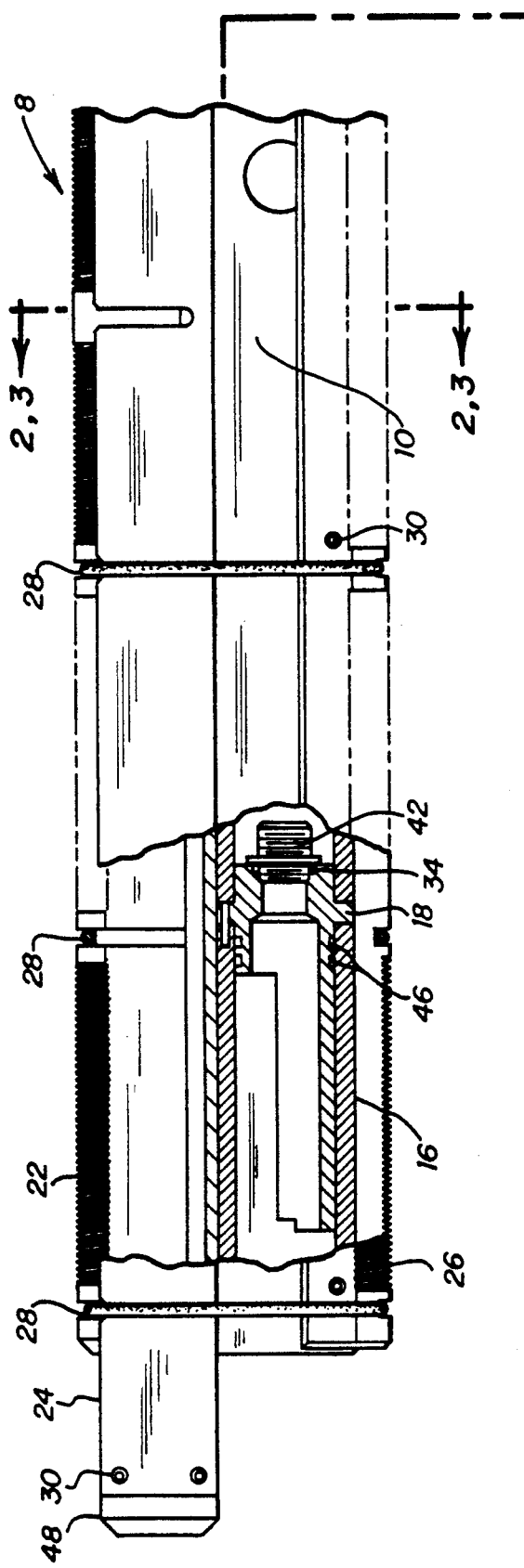
FIG. 1 is a plan view of the apparatus of the present invention.
Figure 1:
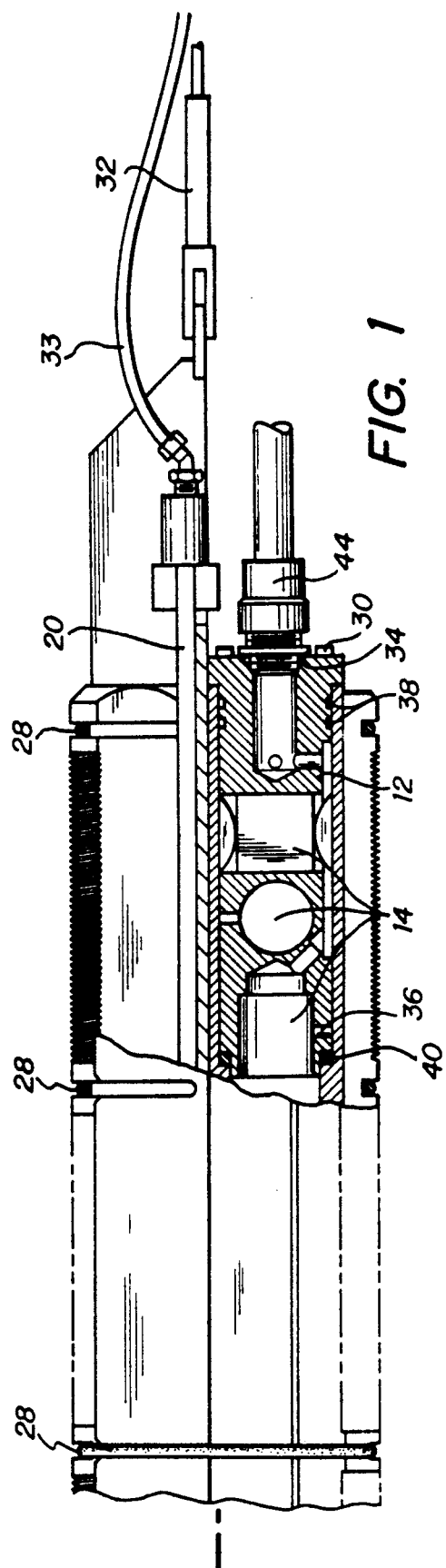

Referring now to FIG. 1, an assembly 8 of the present invention is illustrated. Primary components are a geophone housing 10, geophone mount 12, geophones 14, flux gate sensor housing 16, flux gate sensor mount 18, flux gate sensing apparatus (not shown), inflatable actuator assembly 20, movable contact rod 22 guide channel 24, serrated corner strips 26, and elastomer O-rings 28.

Figure 2:
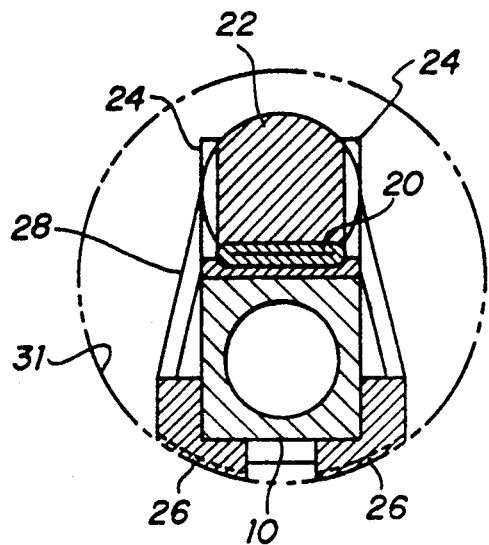
FIG. 2 is a sectional view of the apparatus of FIG. 1.
Figure 3:
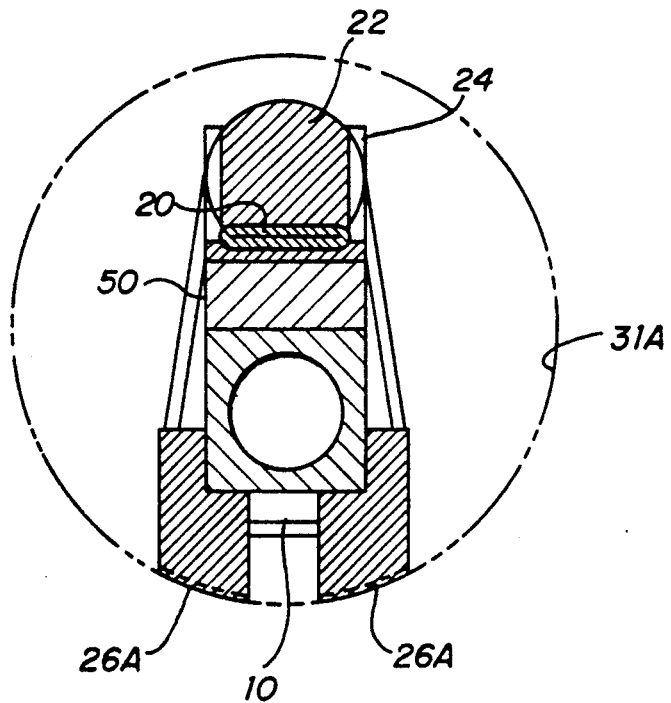
FIG. 3 is a sectional view of an apparatus similar to that of FIG. 1 modified for a larger wellbore.

The serrated edges of strips 26, which extend the length of geophone housing 10 and sensor housing 16 and are attached to these housings with cap screws 30 and shear pins (not shown). Strips 26 are machined to the same radius as the inside pipe radius in which the receiver is used. FIG. 2 illustrates the serrated edges of strips 26 contacting the inside pipe, or wellbore casing, surface 31 while rod 22 is in the retracted position and clearing the inside pipe surface 31 of a six inch casing. FIG. 3 illustrates the serrated edges of strips 26A contacting an inside surface 31A while rod 22 is in the retracted position and clearing the inside pipe surface 31A of an eight inch casing. With rod 22 retracted, the entire assembly is free to slide vertically within the pipe. When the receiver assembly is lowered (or raised) by cable assembly 32 to a predetermined elevation within the borehole lining pipe or casing, actuator fluid (gas or liquid) is forced down tube 33 causing actuator 20 to expand, forcing contact rod 22 against inside surface 31, which in turn causes serrated strips 26 to press against inside surface 31 on the opposite side of assembly 8.

For the bladder used in actuator 20, approximately twenty pounds of clamping force for each psi of differential actuation pressure is applied. Thus for a maximum inflation pressure of one hundred psi, about two thousand pounds of clamping force is distributed uniformly along the length of the assembly. Bench tests indicate that a minimum pressure of twenty psi is needed to overcome the resistance in elastomer O-rings 34 and clamp the assembly securely to the wellbore casings.

Both contact rod 22 and actuator 20 are flexible, which causes the serrated radiused outer face of rod 22 to contact the inside surface 31 of the pipe along a line running the full length of rod 22 when actuator 20 is inflated. Three sides of nylon rod 22 are machined flat such that rod 22 can slide radially within guide channel 24.

Six O-ring grooves are machined in strips 26 and rod 22. Slots aligning with these grooves are machined in the sides of channel 24 to clear the O-rings. O-rings 28 are initially stretched when actuator 20 is deflated, squeezing rod 22 against actuator 20, causing actuator 20 to flatten as illustrated in FIG. 2. Ledges on the sides of rod 22 engage mating slots in guide channel 24 at the flat section and prevent vertical movement of rod 22 with respect to channel 24.

Three geophones 14 are orthogonally mounted in geophone mount 12 and held in place with set screws 36. O-ring seals 38 prevent leakage of borehole fluid from entering the cavity of housing 10. Geophone mount 12 is held in place by four machine screws (not shown). The bottom end of geophone mount 12 is squeezed against elastomer seal 40, which stabilizes the bottom end of geophone mount 12 against the sidewall of the cavity in housing 10.

Electrical leads from geophones 14 connect to waterproof electrical connector 42, which in turn connects to signal cable connector 44. The cable terminating in connector 44 extends to the surface where it connects to recording instrumentation.

A custom built electronic flux gate sensor card (not shown) may be inserted in the slots in sensor mount 18 and electrically connected to waterproof connector 43. A second cable assembly then delivers sensing signals from the sensor to the surface and delivers electrical power down to the sensor. The sensing coils on the flux gate card must be spaced at least two feet from the bottom geophone 14, which contains a permanent magnet. O-ring seals 46 prevent borehole fluid from entering the cavity of sensor housing 16. Guide channel 24 is attached to geophone housing 10 and sensor housing 16 with flat head machine screws. Bottom fitting 48 prevents actuator 20 from slipping downward.

The configuration shown in FIG. 1 is sized to fit within the inside surface 31 a six-inch schedule 80 PVC pipe. To fit a large diameter wellbores, for example, to fit within the inside surface 31A of an eight-inch schedule 80 PVC pipe as illustrated in FIG. 3, strips 26 are replaced with larger strips 26A which are machined to match the inner radius of the eight-inch pipe. Also, a spacer 50 is inserted between actuator 20 and geophone housing 10 to compensate for the additional nominal two inches in pipe diameter. Such a change can be quickly made in the field using only commonly available hand tools.

Mass production techniques could obviously be used to significantly reduce the fabrication costs of the receiver assembly illustrated in FIG. 1. For example, geophone housing 10 and sensor housing 16 along with channel 24 could be integrated into a single aluminum extrusion. Strips 26 could also be extruded to near shape or made from castings. Rod 22 could be a fiber reinforced plastic molded part, as could the geophone and sensor mounts. Also, elastomer O-rings 28 could be replaced with stainless steel garter springs.

In summary, the design objectives outlined above are believed to have been met by this concept, which should prove to have considerable potential use in borehole seismic applications.

Some of the advantageous features of the present invention are listed as follows. First, interchangeable strips 26, machined to exactly match the inside contour of a specific wellbore casing, provide two separated line areas of contact between the receiver assembly and casing inside surface. Different size strips may be used to accommodate different size well casings. Second, the radiused, serrated edge of contact rod 22 causes the receiver assembly to automatically align with the borehole and seat the serrated strips rigidly against the pipe. Third, rod 22 and channel 24 confine actuator 20 and protect actuator 20 from damage. Elastomer O-rings 28 (or other type springs) bias actuator 20 toward its flattened position while simultaneously retracting rod 22 when actuator 20 is depressured. Fourth, the receiver assembly shown in FIG. 1 provides a clamping force, which is uniformly distributed along the length of the assembly and helps prevent any vibratory resonances from occurring in the assembly. Fifth, while actuator inflation is indicated by pumping fluid through a tube from the surface near the wellhead, a downhole electrically-driven pump could alternatively be used. Such a pump, along with its reservoir and associated hydraulic plumbing and controls, could be located inside a separate downhole module or inside the receiver assembly itself. Sixth, since both actuator 20 and contact rod 22 are flexible, rod 22 is in continuous contact with the inside surface of the casing when actuator 20 is fully inflated. Seventh, the receiver assembly may be configured for either deep well work in oil and gas operations or for relatively shallow well engineering geophysics activities. Eighth, optional downhole azimuth sensing is easily included as shown. Ninth, the configuration may easily be elongated to include additional geophones, gimballed geophones, and downhole electronics. Alternatively, the configuration could be substantially shortened if azimuth sensing is not needed. Tenth, when actuator fluid of the same density as the borehole fluid is pumped down a tube from the surface, actuator bladder pressure is simply obtained as gage pressure at the surface. Eleventh, accelerometers may be directly substituted for geophones to allow the receiver system to be used in recording seismic signals of a broader bandwidth than can be measured by geophones. And finally, the present invention provides three separate, continuous lines of contact as viewed looking down the borehole, causing the receiver assembly to be securely clamped in all directions. Other schemes do not provide equal clamping action. Also, the contact surfaces of alternative prior art schemes are not precisely contoured to exactly match the interior of the casing.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

I claim:

1. Apparatus for positioning seismic detector equipment down a cased borehole comprising:
   housing means for containing the seismic detector equipment;
   borehole clamping means within said housing means that includes a combination of two serrated locking pads;
   contact rod means along the length of said housing means for contacting the borehole casing; and
   inflatable contactor means associated with said locking pads and said contact rod means having a normal position wherein said contactor is uninflated and an energized position wherein said contactor is inflated pressing said pads and said contact rod means against the borehole casing.

2. The apparatus according to claim 1 also including a three component signal detector contained within said housing.

3. The apparatus according to claim 1 also including azimuth sensing equipment contained within said housing.

4. The apparatus according to claim 1 wherein said inflatable contactor means includes means for providing a pressurized gas to inflate an expandable bladder.

5. The apparatus according to claim 4 also including a spacer means for compensating for large diameter wellbores.

6. The apparatus according to claim 1 wherein said inflatable contactor means includes means for providing liquid pressure to inflate an expandable bladder.

7. The apparatus according to claim 6 also including a spacer means for compensating for large diameter wellbores.

8. A method for positioning seismic detector equipment down a cased borehole comprising:
   placing the seismic detector equipment within a housing;
   providing a borehole clamping means within said housing that includes a combination of two serrated locking pads;
   providing a contact rod means along the length of said housing for contacting the borehole casing;
   lowering said housing down said cased borehole; and
   inflating an inflatable contactor associated with said locking pads to press said pads and said contact rod means against the borehole casing.

9. The method according to claim 8 wherein said inflating step includes the step of:
   filling an expandable bladder with pressurized gas.

10. The method according to claim 8 wherein said inflating step includes the step of:
    filling an expandable bladder with a pressurized liquid.

11. Apparatus for positioning seismic detector equipment down a cased borehole comprising:
    housing means for containing the seismic detector equipment;
    a three component signal detector contained within said housing;
    azimuth sensing equipment contained within said housing;
    borehole clamping means within said housing means that includes a combination of two serrated locking pads;
    contact rod means along the length of said housing means for contacting the borehole casing; and
    inflatable contactor means including means for providing a pressurized fluid to inflate an expandable bladder, said inflatable contactor means associated with said locking pads and said contact rod means having a normal position wherein said contactor is uninflated and an energized position wherein said contactor is inflated pressing said pads and said contact rod means against the borehole casing.

12. The apparatus according to claim 11 also including a spacer means for compensating for large diameter wellbores.

* * * * *